(12) United States Patent
Kim

(10) Patent No.: US 8,526,033 B2
(45) Date of Patent: Sep. 3, 2013

(54) LIGHT EMITTING UNIT ON AN IMAGE FORMING DEVICE FOR EMITTING A LIGHT COLOR BEAM MAPPING WITH A COLOR DISPLAYED ON A HOST DEVICE DURING PRINTING

(75) Inventor: Geun-tae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 11/684,282

(22) Filed: Mar. 9, 2007

(65) Prior Publication Data
US 2007/0279680 A1 Dec. 6, 2007

(30) Foreign Application Priority Data
Jun. 5, 2006 (KR) .................. 10-2006-0050489

(51) Int. Cl.
*G06F 3/12* (2006.01)
(52) U.S. Cl.
USPC ........................................ 358/1.15
(58) Field of Classification Search
None
See application file for complete search history.

(56) References Cited

U.S. PATENT DOCUMENTS

| 4,600,918 | A * | 7/1986 | Belisomi et al. | 345/160 |
|---|---|---|---|---|
| 7,679,762 | B2 * | 3/2010 | Odagiri | 358/1.15 |
| 2002/0062364 | A1 * | 5/2002 | Watanabe | 709/223 |
| 2002/0091971 | A1 * | 7/2002 | Sawada et al. | 714/46 |
| 2004/0059995 | A1 * | 3/2004 | Takabayashi et al. | 715/500 |
| 2005/0174547 | A1 * | 8/2005 | Yamaguchi et al. | 353/122 |
| 2006/0221356 | A1 * | 10/2006 | Kawai | 358/1.1 |
| 2006/0221863 | A1 * | 10/2006 | Ishimoto et al. | 370/254 |
| 2007/0046967 | A1 * | 3/2007 | Bounar | 358/1.13 |

FOREIGN PATENT DOCUMENTS

| JP | 9-190397 | 7/1997 |
|---|---|---|
| JP | 2004-30590 | 1/2004 |

OTHER PUBLICATIONS

JP2004328270 (Date: Nov. 18, 2004).*

* cited by examiner

*Primary Examiner* — Fan Zhang
(74) *Attorney, Agent, or Firm* — Stanzione & Kim, LLP

(57) ABSTRACT

An image forming device, a host device and a method of driving the same. The image forming device is connected to the host device through the network to perform a printing as requested by the host device and includes a light emitting unit and a controller. The light emitting unit emits a color light beam. The controller controls the host device to display a color mapped with the color of the light beam emitted from the light emitting unit during the printing. Thus, a user can easily know a position of the image forming device performing the printing and distinguish the printing processed by the image forming device, through the light beam emitted from the light emitting unit formed on an outer surface of the image forming device.

20 Claims, 10 Drawing Sheets

LIGHT EMITTING UNIT ON AN IMAGE FORMING DEVICE FOR EMITTING A LIGHT COLOR BEAM MAPPING WITH A COLOR DISPLAYED ON A HOST DEVICE DURING PRINTING

CROSS-REFERENCE TO RELATED APPLICATIONS

This application claims priority under 35 U.S.C. §119(a) of Korean Patent Application No. 2006-50489 filed Jun. 5, 2006, in the Korean Intellectual Property Office, the disclosure of which is incorporated herein it its entirety by reference.

BACKGROUND OF THE INVENTION

1. Field of the Invention

The present general inventive concept relates to an image forming device, a host device to communicate with the image forming device, and a method of driving the image forming device and the host device. More particularly, the present general inventive concept relates to an image forming device capable of determining a position of an image forming device to which a printing is requested, and distinguishing the printing of the image forming device, a host device to communicate with the image forming device, and a method of driving the image forming device and the host device.

2. Description of the Related Art

In general, image forming devices refer to devices which print image data transmitted from host devices, such as computers, onto recording paper sheets. Examples of the image forming devices include copiers, printers, facsimiles, multifunction peripherals (MFPs) performing functions of the copiers, printers, and facsimiles, etc.

Such an image forming device may be connected to a host device through a transmission cable or the like. Alternatively, the image forming device may log into a network to be connected to a plurality of host devices and a plurality of image forming devices or a plurality of host devices and an image forming device. Accordingly, the image forming device may be connected to host devices in various forms.

FIG. 1 is a view illustrating a conventional printing system. Referring to FIG. 1, in the conventional printing system, a plurality of host devices 20-1, 20-2, . . . , and 20-$m$ may be connected to a plurality of image forming devices 30-1, 30-2, . . . , and 30-$n$ through a network 10.

If the conventional printing system is formed in the above structure, for example, if the host device 20-2 is connected to the image forming device 30-1 designated by an IP address and the like, the host device 20-2 may identify the image forming device 30-1 through the IP address and the like to print printing data on a recording paper sheet.

However, a user may not recognize which one of the plurality of image forming devices 30-1, 30-2, . . . , and 30-$n$ is outputting a printed matter of the user.

For example, the user must use position information and description information of the image forming device 30-1 performing a printing operation of the user to determine the image forming device 30-1 that is outputting the printed matter on a user interface window displayed on the host device 20-2.

The user must also search for the image forming device 30-1 which is outputting the printed matter of the user, through an operation panel (OPE) display or a network constitution page with reference to the IP address and the like of the image forming device 30-1.

Even if the plurality of host devices 20-1, 20-2, . . . , and 20-$m$ transmit printing data to an image forming device, for example, the image forming device 30-1, to perform a printing operation, the user must physically move to a position of the image forming device 30-1 to confirm the printed matter to determine a printing status of the printed matter such as a printing waiting, a printing duration, a printing completion, or the like.

SUMMARY OF THE INVENTION

The present general inventive concept provides an image forming device capable of determining a position of an image forming device that performs a printing operation requested by a user on a network, and distinguishing the printing operation which is performed by the image forming device.

The present general inventive concept provides a host device connected to the image forming device.

The present general inventive concept provides a method of driving the image forming device and the host device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming device connected to a host device through a network to perform a printing operation as requested by the host device, the image forming device including a light emitting unit to emit a color light beam, and a controller to control the host device to display a color mapped with the light beam emitted from the light emitting unit during the printing operation.

The controller may transmit color information corresponding to the mapped color to the host device to display the mapped color in a predetermined display area of the host device.

A plurality of colors of the light beam may be emitted from the light emitting unit.

The controller may transmit color information corresponding to the mapped color so as to display the mapped color in a predetermined display area of the host device, receive the printing data and the color information from the host device, so that the light emitting unit emits a light beam that has a color that matches the mapped color during the printing operation.

The controller may map the host device with a color designated in response to a color designation signal transmitted from an external source. The controller may determine whether the color designated according to the color designation signal is a color used in another image forming device connected to the network, and if it is determined that the color designated according to the color designation signal is the color used in the another image forming device connected to the network, transmit the determination result to the host device, and control the light emitting unit to flicker.

The controller may identify a color used in another image forming device that is connected to the network and map one of colors not including the color used in the host device.

The controller may map one of the colors with the host device according to a color queue in which the colors are arranged in a predetermined order. The controller may transmit to the host device information regarding a host device requesting a current printing, information regarding a color mapped with the host device currently requesting the printing according to the color queue, information regarding a host device requesting a printing in waiting, and information regarding a color mapped with the host device requesting the printing in waiting according to the color queue.

The foregoing and/or other aspects and utilities of the present general inventive concept may also be achieved by providing a host device which is connected to an image forming device including a light emitting unit to emit a color light beam through a network, to request a printing operation to the image forming device, including a user interface to display status information and to drive information of the image forming device, and a controller to control the user interface to display the color of the light beam emitted from the light emitting unit during the printing operation.

The controller may receive color information corresponding to the color of the light beam emitted from the light emitting unit from the image forming device and display the color on the user interface.

The controller may receive the color information and image update information from the image forming device to display a color on the user interface.

The foregoing and/or other aspects and utilities of the present general inventive concept may also be achieved by providing a method of driving an image forming device connected to a host device through a network to perform a printing operation as requested by the host device and having a light emitting unit to emit a color light beam, including mapping the host device that requests the printing operation to a corresponding color, and controlling the light emitting unit to emit a light beam having a color equal to the color mapped with the host device during the printing operation as requested by the host device.

The method may further include transmitting color information corresponding to the mapped color to the host device to display the mapped color in a predetermined display area of the host device.

The light emitting unit may emit a light beam in a plurality of colors.

The method may further include designating a color of the light beam emitted from the light emitting unit in response to a color designation signal transmitted from an external source, determining whether a color equal to the designated color is used on the network, if it is determined that the color equal to the designated color is used on the network, outputting a color collision warning signal to the host device that requests the printing operation and allowing the light emitting unit to flicker, and if it is determined that the color equal to the designated color is not used on the network, mapping the designated signal with the host device that requests the printing operation and transmitting information regarding the mapped color to the host device.

The method may further include, determining the color used on the network, designating one of colors not including the color used on the network as a color of the light beam emitted from the light emitting unit, mapping the designated color to the host device that requests the printing operation, and transmitting color information corresponding to the mapped color to the host device that requests the printing operation.

The method may further include determining whether a previous printing operation is being performed, if it is determined that the previous printing operation is being performed, determining a color mapped to a host device which has requested the previous printing operation and mapping a color of the colors not including the determined color to a host device performing a current printing operation, if it is determined that the previous printing operation is not being performed, mapping the host device currently requesting the printing operation according to an order of a color queue in which the colors are arranged in a predetermined order, and transmitting information regarding the mapped colors to the host device.

The foregoing and/or other aspects and utilities of the present general inventive concept may also be achieved by providing a method of driving a host device connected to an image forming device having a light emitting unit to emit a color light beam through a network to request a printing operation to the image forming device, including outputting the printing data; receiving color information from the image forming device in response to the requested printing operation; and displaying the color on a user interface that displays status information and driving information of the image forming device.

The color information and image update information may be received from the image forming device to display the color on the user interface.

The foregoing and/or other aspects and utilities of the present general inventive concept may also be achieved by providing a printing system including an image forming device to generate one or more signals representing a plurality of colors to correspond to one or more of printing operations and external host devices.

The foregoing and/or other aspects and utilities of the present general inventive concept may also be achieved by providing a printing system including a host device to generate one or more signals representing a plurality of colors to correspond to at least one of printing operations and external image forming apparatuses.

The foregoing and/or other aspects and utilities of the present general inventive concept may also be achieved by providing a printing system including an image forming device to generate one or more signals representing one or more of colors to correspond to one or more printing operations, and a host device to generate a signal representing one or more second colors to correspond to one or more image forming devices including the image forming device.

The foregoing and/or other aspects and utilities of the present general inventive concept may also be achieved by providing a method of a printing system, the method including generating one or more signals representing one or more colors to correspond to one or more printing operations and external host devices.

The foregoing and/or other aspects and utilities of the present general inventive concept may also be achieved by providing a method of printing system, the method including generating one or more signals representing one or more colors to correspond to at least one of printing operations and external image forming apparatuses.

The foregoing and/or other aspects and utilities of the present general inventive concept may also be achieved by providing a method of a printing system, the method including an image forming device to generate one or more signals representing one or more of colors to correspond to one or more printing operations, and a host device to generate a signal representing on or more second colors to correspond to one or more image forming devices including the image forming device.

The foregoing and/or other aspects and utilities of the present general inventive concept may also be achieved by providing a computer readable recording medium containing computer readable codes as a program to perform a method, the method including an image forming device to generate one or more signals representing a plurality of colors to corresponding to one or more of printing operations and other host devices.

The foregoing and/or other aspects and utilities of the present general inventive concept may also be achieved by providing a computer readable recording medium containing computer readable codes as a program to perform a method, the method including a host device to generate one or more signals representing a plurality of colors to correspond to at least one of printing operations and external image forming apparatuses.

The foregoing and/or other aspects and utilities of the present general inventive concept may also be achieved by providing a printing system including a device to select one or more color to be assigned to one or more of an image forming device, a host device, and a printing device.

The foregoing and/or other aspects and utilities of the present general inventive concept may also be achieved by providing a method of driving an image forming device connected to a host device through a network to perform a printing operation as requested by the host device and having a light emitting unit to emit a color light beam, the method including determining whether a previous printing operation is being performed, if it is determined that the previous printing operation is being performed, determining a color mapped to a host device which has requested the previous printing operation and mapping a color of the colors not including the determined color to a host device performing a current printing operation, if it is determined that the previous printing operation is not being performed, mapping the host device currently requesting the printing operation according to an order of a color queue in which the colors are arranged in a predetermined order, and transmitting information regarding the mapped colors to the host device.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
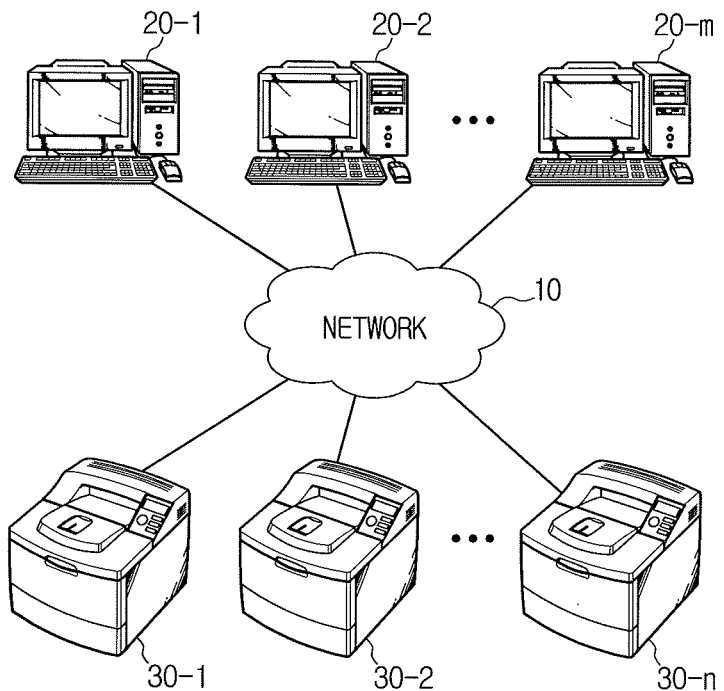
FIG. 1 is a view illustrating a conventional printing system.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
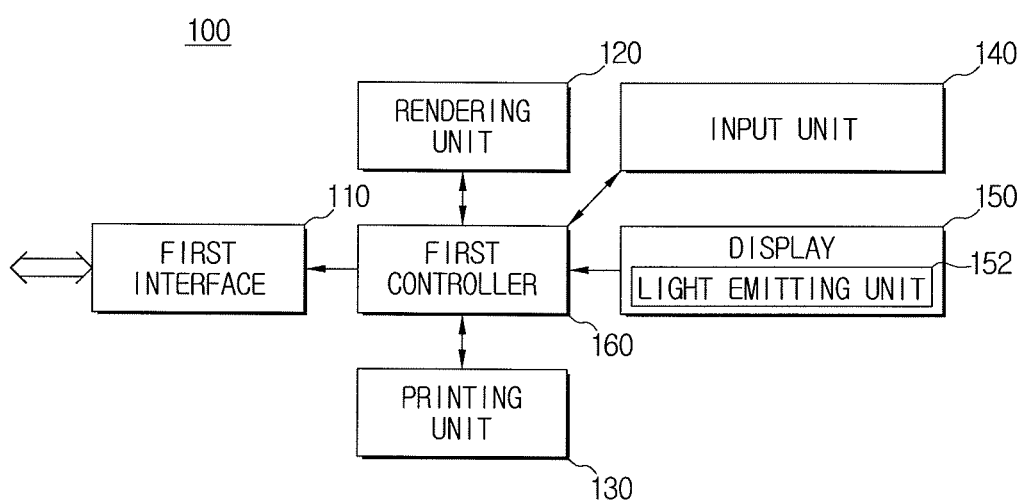
FIG. 2 is a schematic block diagram of an image forming device according to an embodiment of the present general inventive concept.
Figure 3:
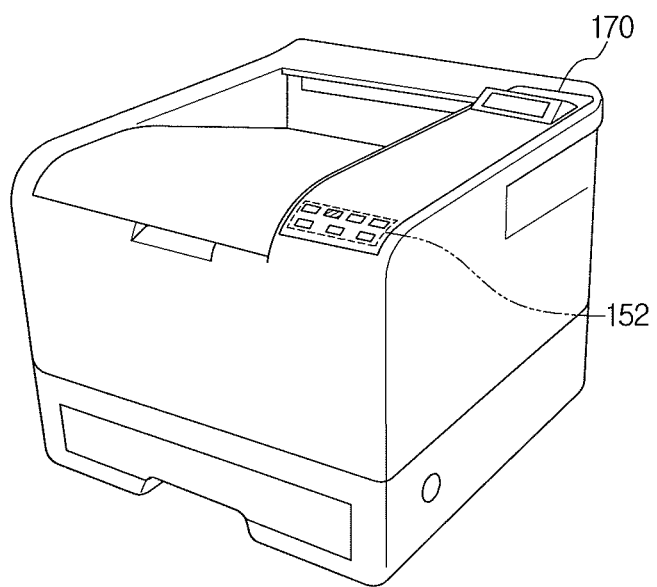
FIG. 3 is a schematic perspective view illustrating an external appearance of the image forming device illustrated in FIG. 2.

FIG. 2 is a schematic block diagram of an image forming device according to an embodiment of the present general inventive concept, and FIG. 3 is a schematic perspective view illustrating an external appearance of the image forming device illustrated in FIG. 2. Referring to FIGS. 2 and 3, an image forming device 100 according to the present embodiment includes a first interface 110, a rendering unit 120, a printing unit 130, an input unit 140, a display 150, and a first controller 160.

The first interface 110 may be used to log into a network (not illustrated) to connect the image forming device 100 to host devices (not illustrated). The first interface 110 may also be connected to the host devices to transmit commands to execute a printing of data which is written by the host devices on application programs.

The rendering unit 120 renders the commands transmitted from the first interface 110 to transform the commands into bitmap data.

The printing unit 130 performs a printing operation based on the bitmap data transformed by the rendering unit 120. For example, if the image forming device 100 is a laser printer, the printing unit 130 transfers a recording paper sheet along a transfer path, transfers an image corresponding to printing data onto the recording paper sheet using a developer, presses the image, i.e., the developer, transferred onto the recording paper sheet at a high temperature, and fixes and fuses the image on the recording paper sheet to perform the printing operation.

The input unit 140 includes a plurality of numerical keys and a plurality of function keys to apply various control signals generated through key manipulations of a user to the first controller 160.

The display 150 include a liquid crystal display (LCD) or segments to display an operation status of the image forming device 100. In general, the input unit 140 and the display 150 may be integrated into an operating panel (OPE) 170 or a touch screen panel.

The display 150 further includes a light emitting unit 152 which emits light beams in a plurality of colors. The light emitting unit 152 may emit light beams in different colors according to the image forming devices that perform a printing operation, or the printing data that is transmitted from the hosts.

In detail, the light emitting unit 152 includes a plurality of light sources that generate light beams which have different colors or a light source that generates a multi-colored light beam. Alternatively, the light emitting unit 152 may include a light source emitting a monochromatic light beam.

The light emitting unit 152 may be disposed on an outer surface of the image forming device 100 as illustrated in FIG. 3, so that a user identifies a color of a light beam emitted from the light emitting unit 152 without moving to a position of the image forming device 100.

Here, the light emitting unit 152 may emit the same color light beam mapped to a host device through which the user requests the printing operation so that a user easily identifies the image forming device connected to the host device.

When a plurality of host devices connected to a network request printing operations to an image forming device, the light emitting unit 152 may emit a monochromatic light beam mapped to each printing data. That is, to distinguish the host device which has requested the currently processing printing operation, a monochromatic light beam may correspond to particular printing data from each of the plurality of host devices.

The first controller 160 controls an overall operation of the image forming device 100 in response to the commands transmitted from the first interface 110 or the various control signals transmitted from the input unit 140. In particular, the first controller 160 interfaces with the host devices to map one of colors of light beams, so that one of colors of light beams can be emitted from the light emitting unit 152 with a corresponding one of the host devices that requests a printing operation. If a printing operation is requested from each of the host devices, the first controller 160 controls the printing unit 130 to perform the corresponding printing operation. The first controller 160 also controls the light emitting unit 152 to emit a light beam which has a color equal to the color mapped by each of the host devices.

A method of driving the first controller 160 of FIG. 2 will now be described in more detail.

Figure 7:
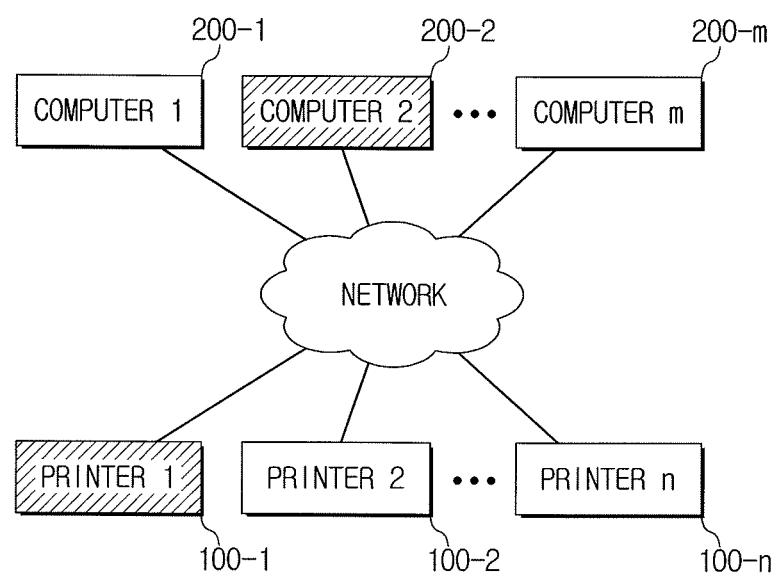
FIG. 7 is a view illustrating a method of determining positions of image forming devices connected to a network, according to an embodiment of the present general inventive concept.
Figure 8:
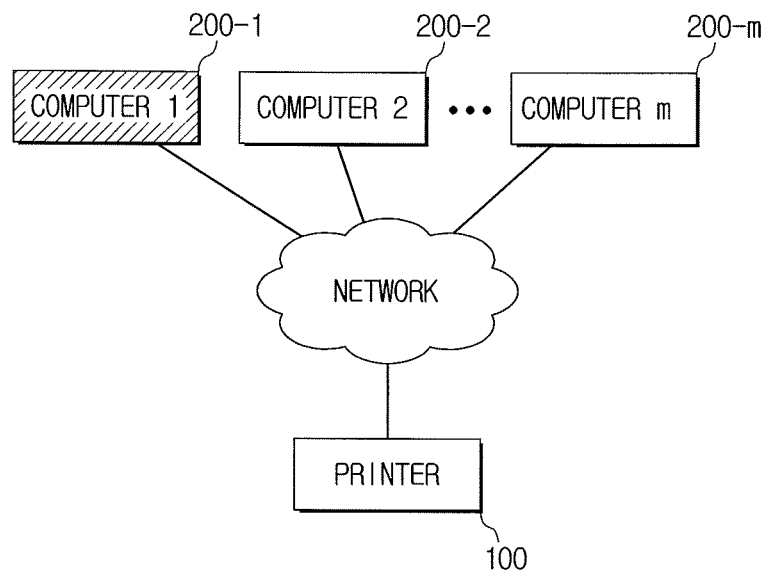
FIG. 8 is a view illustrating a method of distinguishing a printing processed by an image forming device connected to a network, according to an embodiment of the present general inventive concept.

FIG. 7 is a view illustrating a method of determining positions of image forming devices connected to a network, according to an embodiment of the present general inventive concept, and FIG. 8 is a view illustrating a method of distinguishing a printing operation of an image forming device connected to a network, according to an embodiment of the present general inventive concept.

Referring to FIGS. 2, 7, and 8, if the first controller 160 desires to determine a position of a specific image forming device 100-1 of a plurality of image forming devices 100-1, 100-2, . . . , 1 and 100-*n* that perform a print job transmitted from a specific host device 200-2 using the light emitting unit 152 as illustrated in FIG. 7, wherein the plurality of image forming devices 100-1, 100-2, . . . , and 100-*n* are connected to the network, and a printing command is given by the specific host device 200-2, the first controller 160 designates a color to be mapped to the specific corresponding host device 200-2. The controller 160 also controls the light emitting unit 152 to emit a light beam that has a color equal to the mapped color during the printing given by the specific host device 200-2.

In order to distinguish printing operations requested by a plurality of host devices 200-1, 200-2, . . . , and 200-*m* connected through the network to the image forming device 100 using the light emitting unit 152 as illustrated in FIG. 8, the first controller 160 designates colors to be mapped with the plurality of host devices 200-1, 200-2, . . . , and 200-*m*. The first controller 160 also controls the light emitting unit 152 to emit light beams having colors equal to the colors mapped with the plurality of host devices 200-1, 200-2, . . . , and 200-*m* during the printing operation requested from the plurality of host devices 200-1, 200-2, . . . , and 200-*m*. For example, a first color is assigned to the host device 200-1, and a second color is assigned to the host device 200-2.

The first controller 160 also controls the first interface 110 to output color information corresponding to the mapped colors.

Figure 4:
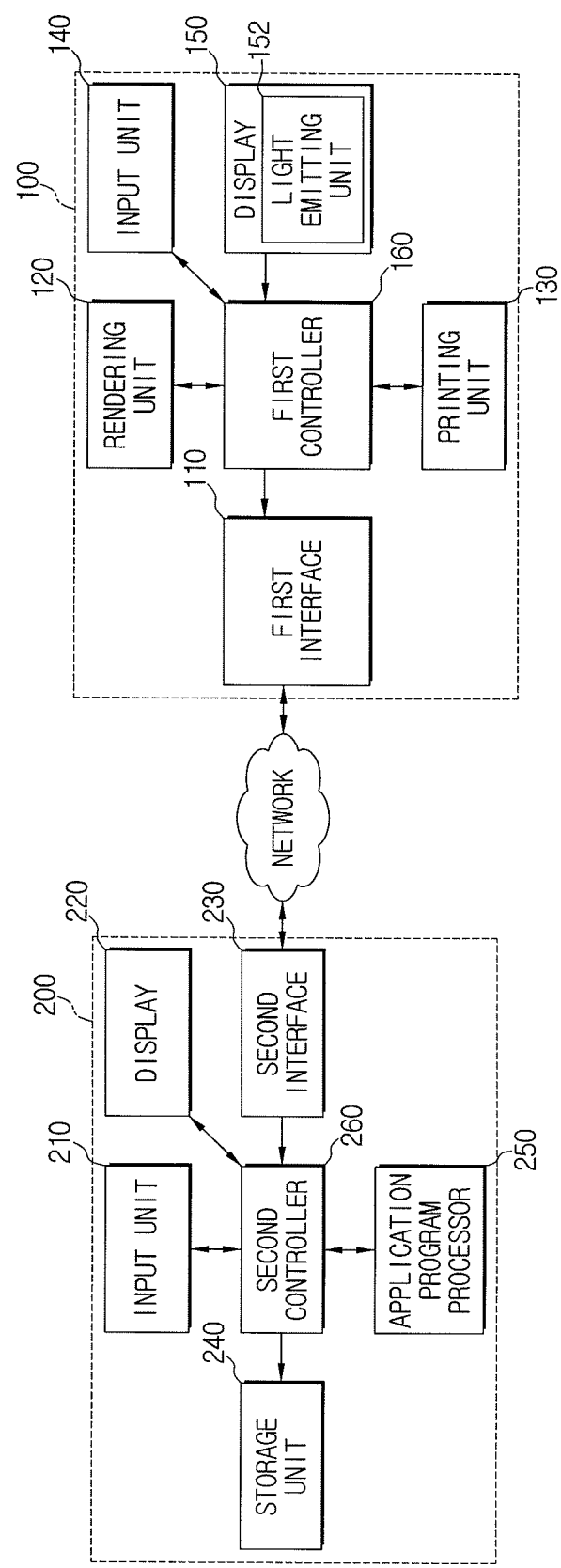
FIG. 4 is a schematic block diagram of a printing system according to an embodiment of the present general inventive concept.
Figure 5:
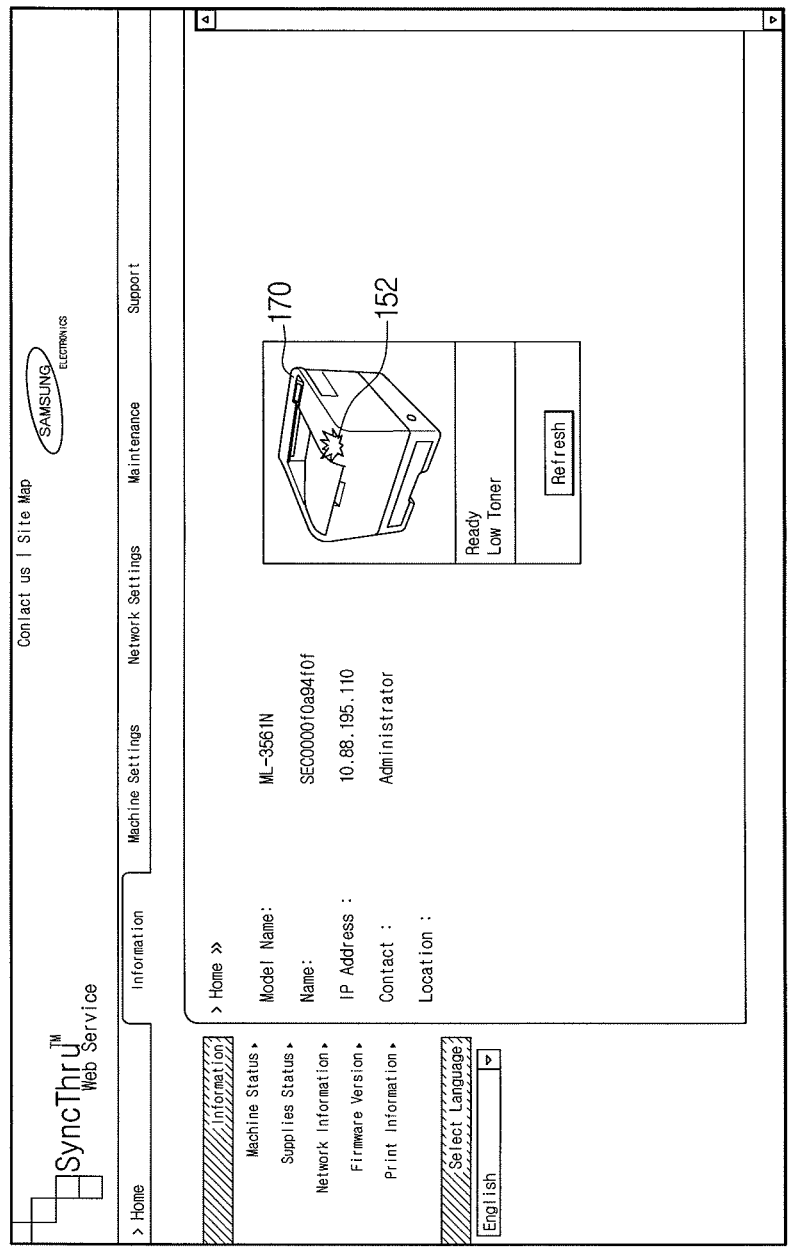
FIG. 5 is a view illustrating a user interface window displayed on a display illustrated in FIG. 4, according to an embodiment of the present general inventive concept.
Figure 6:
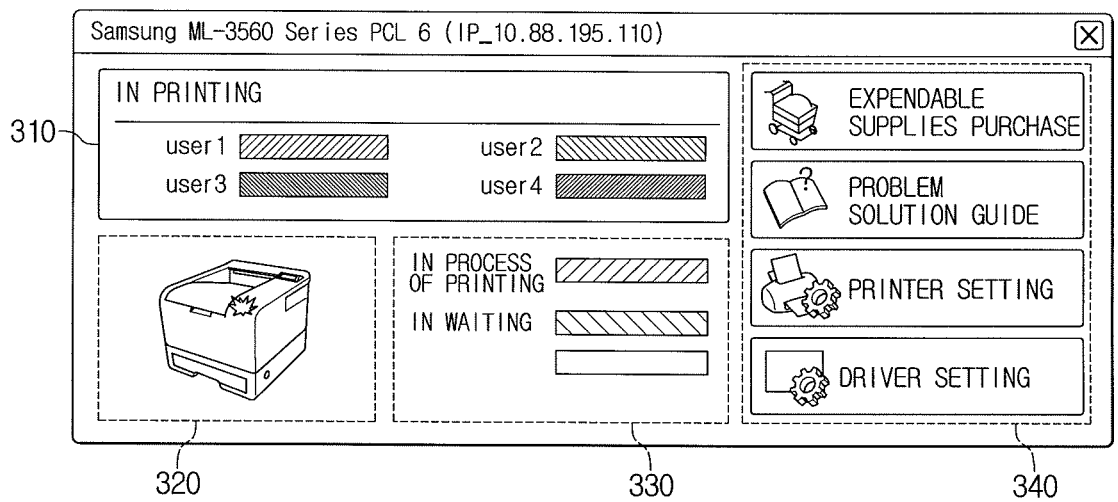
FIG. 6 is a view illustrating a user interface window displayed on the display illustrated in FIG. 4, according to another embodiment of the present general inventive concept.

FIG. 4 is a schematic block diagram of a printing system according to an embodiment of the present general inventive concept, FIG. 5 is a view illustrating a user interface window displayed on a display 220 illustrated in FIG. 4, according to an embodiment of the present general inventive concept, and FIG. 6 is a view illustrating a user interface window displayed on the display 220 illustrated in FIG. 4, according to another embodiment of the present general inventive concept Referring to FIG. 4, the printing system according to the present embodiment includes an image forming device 100 and a host device 200.

The image forming device 100 is substantially the same as the image forming device 100 illustrated in FIG. 2. Thus, like reference numerals denote like elements, and repeated detailed descriptions of the elements will be omitted so as not to make the present general inventive concept unclear.

The host device 200 includes an input unit 210, a display 220, a second interface 230, a storage unit 240, an application program processor 250, and a second controller 260.

A user inputs user commands to perform various functions of the host device, data to generate printing data using various application programs, etc., into the input unit 210. For example, the input unit 210 may a keyboard, a mouse, or the like.

The display 220 may display a first user interface window into which the user can input the data to generate the printing data using the various application programs, etc., and a second user interface window on which the user can identify status information or driving information of the image forming device 100. Here, the second user interface window as illustrated in FIG. 5 or 6 may be formed on the display 220.

The second interface 230 is connected to a network to connect the host device 200 to the image forming device 100. Also, the printing data and a printing command to perform the printing operation may be output to the image forming device 100 through the second interface 230.

The storage unit 240 may include a nonvolatile memory which stores an operating system necessary to drive the host device 200, various application programs, etc., and a volatile memory which temporarily stores data generated during driving of the various application programs, data to perform a printing process, etc. Here, the storage unit 240 may temporarily store color information output from the image forming device 100.

The application program processor 250 controls the driving of the various application programs stored in the storage unit 240 and controls the display 220 to display the first user interface window to write the printing data.

The second controller 260 controls an overall operation of the host device 200 in response to commands or various control signals received through the input unit 210. In particular, the second controller 260 outputs the printing command received through the input unit 210 to the image forming device 100, transforms the color information output from the image forming device 100 and the printing data written in the host device 200 into packets, and outputs the packets.

The second controller 260 also controls the display 220 to display status information of the image forming device 100 on the second user interface as illustrated in FIG. 5 or 6.

Here, reference numerals 310, 320, and 330 denote a user display part, a printer image display part, and a status information display part, respectively. The user display part 310 displays one or more host devices, for example, user1, user2, user3, and user4, to request printing operations to the image forming device 100 according to colors mapped to the host devices, wherein the colors may be emitted from the light emitting unit 152. The printer image display part 320 displays a printer image displaying a color equal to a color of a light beam emitted from the light emitting unit 152 of the image forming device 100. The status information display part 330 displays status information of the image forming device 100 which is performing the printing operation, and therefore, the status information display part 330 indicates which of the plurality of host devices 200-1, 200-2, . . . , and **200-*m* of FIG. 7 has requested the printing. Also, reference numeral 340 denotes an environment information display part through which the image forming device 100** including an embedded web server (EWS) is connected to an Internet to check a status of a printer, statuses of expendable supplies, etc., and transmit a control command.

Here, the second user interface window may be formed to display the user display part 310 and the status information display part 330 in various forms.

FIGS. 9 through 12 are flowcharts of methods of driving an image forming device according to embodiments of the present general inventive concept.

Figure 9:
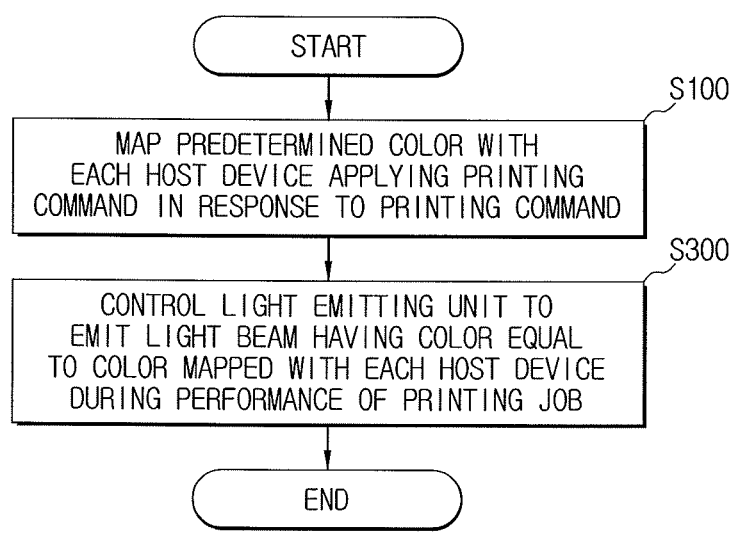
FIGS. 9 through 12 are flowcharts illustrating methods of driving an image forming device according to embodiments of the present general inventive concept.

Referring to FIGS. 2 and 9, the method of driving the image forming device according to the present embodiment includes operations S100 and S300. In operation S100, one of a plurality of colors of light beams emitted from the light emitting unit 152 is mapped to the host device 200 in response to a printing command to perform a printing operation. In operation S300, the light emitting unit 152 is controlled to emit a light beam having a color equal to the color mapped to the host device 200 during the printing operation requested by the host device 200.

If the light emitting unit 152 is driven to determine a position of an image forming device performing the printing operation requested by a user on a network as illustrated in FIG. 7, operation S100 may be performed using the follow method.

Figure 10:
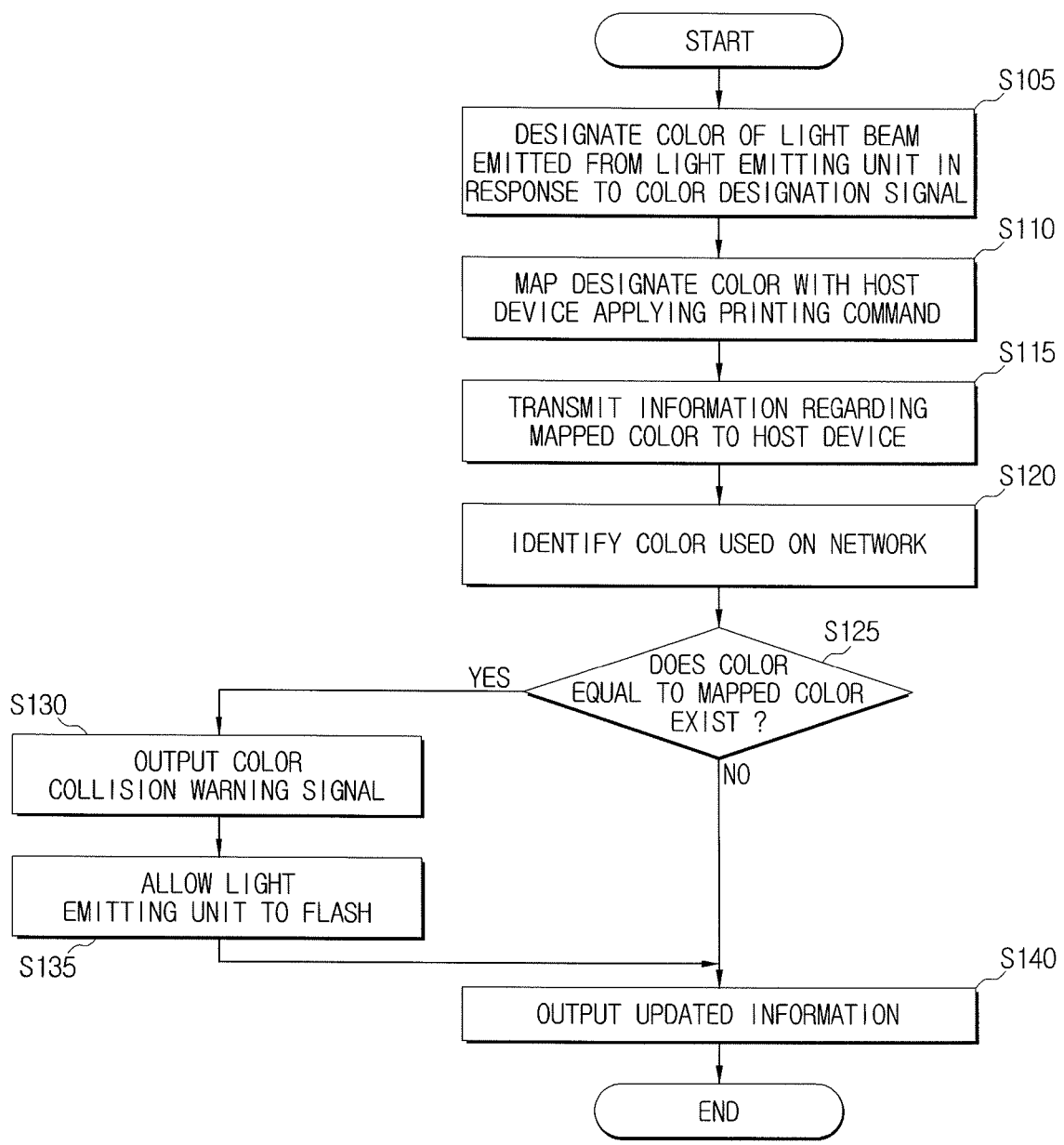

Referring to FIGS. 2, 7, and 10, operation S100 of FIG. 9 includes operations S105, S110, S115, S120, S125, S130, S135, and S140. In operation S105, a color of a light beam emitted from the light emitting unit 152 is designated in response to a color designation signal transmitted from an external source. In operation S110, the designated color is mapped to a host device executing a printing command. In operation S115, information regarding the mapped color is transmitted to the host device. In operation S120, a color used on a network is identified. In operation S125, a determination is made as to whether a color equal to the mapped color exists. If it is determined in operation S125 that the color equal to the mapped color exists, a color collision warning signal is output in operation S130. In operation S135, the light emitting unit 152 flickers in response to the color collision warning signal. If it is determined that the color equal to the mapped color does not exist in operation S125, or if the light emitting unit 152 flickers in operation S 135, updated information of the information regarding mapped color is output in operation S140.

In operation S105, the color designation signal may be input by the user. For example, the color designation signal may be received through the input unit 210 of the host device 200-2 and then input to the image forming device 100-1 through the second interface 230 or may be directly input to the image forming device 100-1 through the input unit 140 of the image forming device 100-1. As described above, a color of a light beam emitted from the light emitting unit 152 may be designated by the color designation signal directly input by the user.

In operation S110, the color designated by the input of the user is mapped to the host device 200-2 executing the printing command. Here, the first controller 160 of the image forming device 100-1 updates the color of the light beam emitted from the light emitting unit 152 according to the designated color.

The updating of the color of the light beam emitted from the light emitting unit 152 represents that information regarding a pre-set color may be removed depending on performance of a previous printing operation, and the light emitting unit 152 may emit a light beam that has a newly set color.

In operation S115, information regarding the mapped color is transmitted to the host device 200-2. Here, the information regarding the mapped color is transmitted to the host device 200-2 to update a color of a printer image to be used on the second user interface window displayed on a display of the host device 200-2. This will be described later. If the EWS is used, the EWS may update a color of a printer image. Thus, operation S115 may be selectively omitted.

In operation S120, the color used on the network is identified. In other words, each of the image forming devices 100-2, . . . , and **100-*n* on the network is connected to the host devices 200-1, 200-3, . . . , and 200-*m* to identify colors mapped with the host devices 200-1, 200-3, . . . , and 200-*m*. Here, the image forming device 100-1 may simultaneously broadcast a command to the image forming devices 100-2, . . . , and 100-*n* connected to the network to identify the colors mapped with the host devices 200-1, 200-3, . . . , and 200-*m***.

In operation S125, the determination is made as to whether the color equal to the color mapped with the host device 200-2 exists, based on a response to the broadcast to identify the mapped colors.

If it is determined in operation S125 that the color equal to the color mapped with the host device 200-2 exists, the first controller 160 outputs the color collision warning signal through the first interface 110 in operation S130 and outputs a control signal to control flickering of the light emitting unit 152 according to the color collision warning signal so that the light emitting 152 flickers in operation S135. The user may identify through the flickering of the light emitting unit 152 that the color equal to the color mapped with the host device 200-2 is mapped with the host devices 200-1, 200-3, . . . , and **200-*m*** on the network.

If it is determined in operation S125 that the color equal to the mapped color does not exist, updated information of the information regarding the designated color of the light emitting unit 152 and updated information of the printer image is output through the first interface 110 in operation S140. Also, after the light emitting unit 152 is flickered in operation S130, the information regarding the designated color and the updated information of the printer image is output through the first interface 110 in operation S140. If the image forming device 100-1 does not include the EWS, the printer image may be updated through a printer driver (not illustrated) of the host device 100-2 in operation S140. In this case, the updated information of the printer image may not be output.

Figure 11:
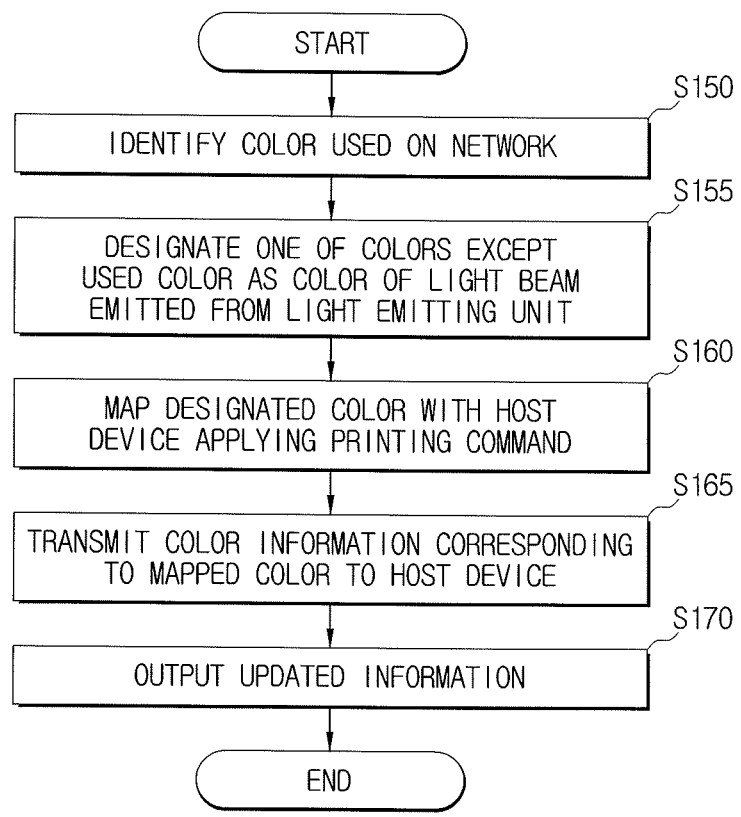

If the light emitting unit 152 is driven to determine a position, operation S110 may be performed using a different method as illustrated in FIG. 11.

Referring to FIGS. 2, 7, and 11, operation S110 of FIG. 10 includes operations S150, S155, S160, S165, and S170. In operation S150, a determination is made as to which color is used on a network. In operation S155, one color, not including the color used on the network, is designated as a color of a light beam emitted from the light emitting unit 152. In operation S160, the designated color is mapped with the host device 200-2 giving a printing command. In operation S165, color information corresponding to the mapped color is transmitted to the host device 200-2. In operation S170, updated information is output.

In operation S150, the image forming device 100-1 broadcasts a command to the image forming devices 100-2, . . . , and **100-*n* on a network to designate a color of a light beam emitted from the light emitting unit 152 of the image forming device 100-1** and receives responses to the broadcast.

In operation S155, the color of the light beam emitted from the light emitting unit 152 of the image forming device 100-1 is automatically designated based on the responses. In other words, one color, not including the colors used in the image forming devices 100-2, . . . , and 100-*n*, is designated as the color of the light beam emitted from the light emitting unit 152 of the image forming device 100-1.

Operations S160, 165, and 170 are substantially the same as operations S110, S115, and S140 illustrated with reference to FIG. 8, and thus their detailed descriptions will be omitted herein.

Figure 12:
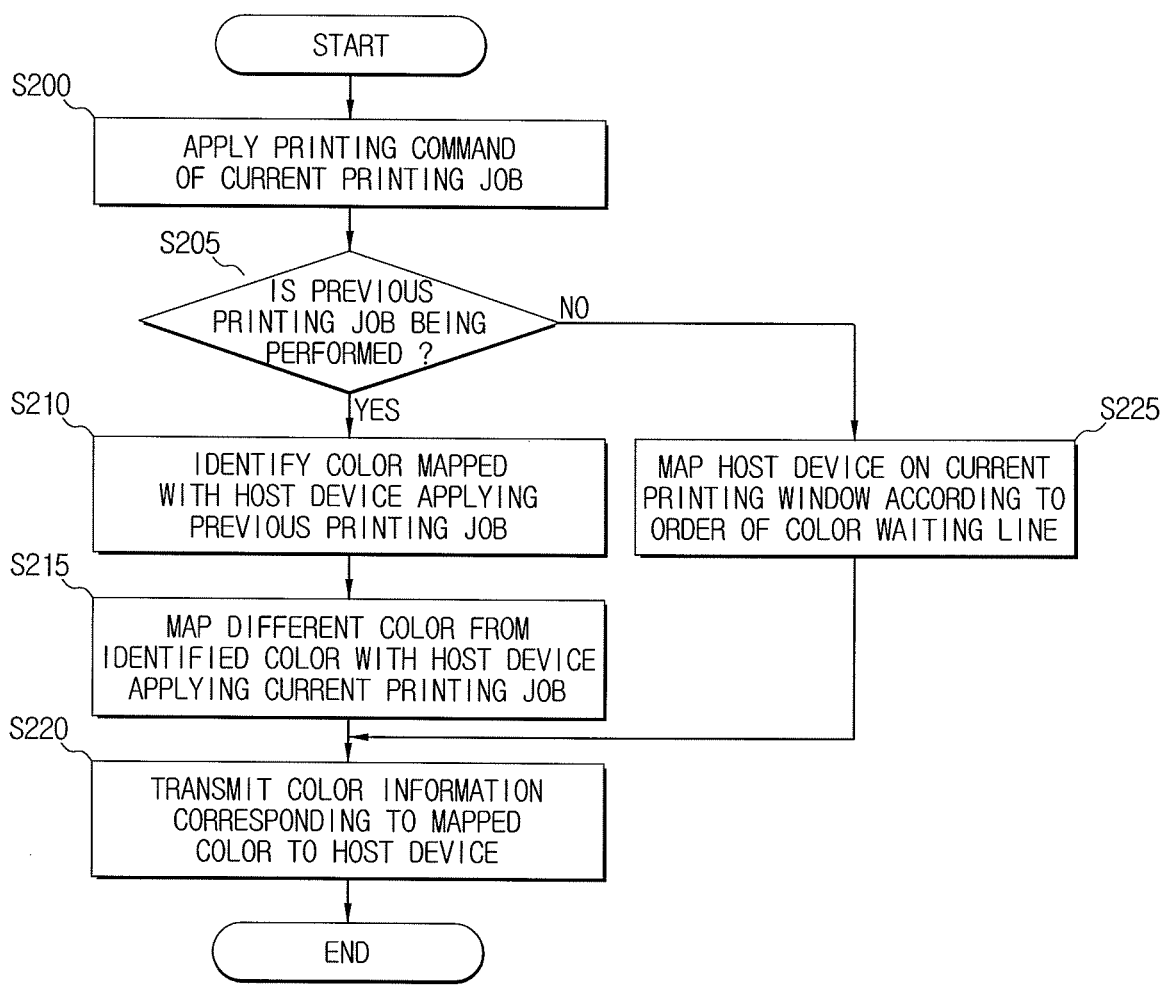

If the light emitting unit 152 is driven to distinguish a printing operation, operation S100 may be performed using the following method as illustrated in FIG. 12.

Referring to FIGS. 2, 8, and 12, operation S100 of FIG. 9 may include operations S200, S205, S210, S215, S220, and S225. In operation S200, a printing command of a current printing operation is received. In operation S205, a determination is made as to whether a previous printing operation is being performed. If it is determined in operation S205 that the previous printing is being performed, a color mapped with the host devices 200-2, . . . , and 200-*m*, which have requested the previous printing operation, is identified in operation S210. In operation S215, a different color from the identified color is mapped with the host device 200-1 that is currently requesting the printing operation. In operation S220, color information corresponding to the mapped color is transmitted to the host devices 200-1, . . . , and 200-*m*. If it is determined in operation S205 that the previous printing operation is not being performed, the host device 200-1 that is currently requesting the printing is mapped according to an order of a color queue in which colors are arranged in a predetermined order in operation S225.

In operation S200, the host device 200-1 applies the printing command of the current printing operation to the specific image forming device 100 of the image forming devices on the network.

In operation S205, a determination is made as to whether a printing operation is being performed before the printing command of the current printing is transmitted to the specific image forming device 100.

If it is determined in operation S205 that the previous printing operation is being performed, information regarding the color mapped with the host devices 200-2, . . . , and 200-*m* which have requested the previous printing operation is identified in operation S210.

In operation S215, one of different colors from the colors identified in operation S210 is mapped to the host device 200-1. Here, the first controller 160 of the image forming device 100 maps the host device 200-1 that currently requests the printing operation according to the order of the color queue. In other words, the host device 200-1 that currently requests the printing operation is mapped with a color next to the color mapped with the host devices 200-2, . . . , and 200-*m*, which have requested the previous printing operation.

For example, if the order of the color queue is defined in order of red, orange, yellow, green, blue, indigo, and violet colors, and the red and orange colors are mapped with the host devices 200-2, 200-*m* which have requested the previous printings, the host device 200-1 currently requesting the printing is mapped with the yellow color.

In operation S220, information regarding the mapped colors is transmitted to the host devices (200-1, 200-2, and 200-*m* in the above example) which have sent the printing command. Here, information regarding host devices which have requested previous printing operations may be transmitted along with color information as packets.

If it is determined in operation S205 that the previous printing operation is not being performed, a host device requesting a current printing operation is mapped according to the order of the color queue in operation S225. In other words, if the color queue is formed in the order as described above, the red color as a first color of the color queue is mapped with the host device that is currently requesting the printing operation.

The image forming device 100 performs S220 after operation S225.

Referring to FIG. 9 again, the image forming device 100 receives the color information transmitted to the host devices 200-1, . . . , and 200-*m* and the requested printing operations of the host devices 200-1, . . . , and 200-*m* as packets in operation S300. When the image forming device 100 performs the printing operations as requested by the host devices 200-1, . . . , and 200-*m*, the image forming device 100 updates the color of the light beam emitted from the light emitting unit 152 so that the light emitting unit 152 emits a light beam having a color corresponding to a color mapped with each of the host devices 200-1, . . . , and 200-*m*, i.e., the transmitted color information.

In other words, when a printing operation as requested by the host device 200-2 is performed as illustrated in FIGS. 10 and 11, the image forming device 100-1 updates the color of the light beam emitted from the light emitting unit 152 so that the light emitting unit 152 of the image forming device 100-1 emits a light beam having a color not including colors mapped to the host devices 200-1, 200-3, . . . , and 200-*m*. If the host device 200-*m* requests the printing operation and the color information as packets as illustrated in FIG. 12, the image forming device 100 responds to the color information (orange color) so that the light emitting unit 152 emits a light beam having an orange color and performs the printing operation. If the printing operation of the host device 200-*m* is completed, the image forming device 100 responds to the printing request and color information (yellow color) given by the host device 200-1 to update the color of the light beam emitted from the light emitting unit 152 so that the light emitting unit 152 emits a light beam having a yellow color and performs the printing operation as requested by the host device 200-1.

The user may determine a position of an image forming device from a plurality of image forming devices that perform a printing operation of the user and distinguish a printing operation performed by a predetermined image forming device through a color of a light beam emitted from the light emitting unit 152, wherein the image forming devices are connected to a network.

In the above description, only one image forming device 100 as illustrated in FIG. 8 was exemplified to maintain convenience of understanding. However, one will appreciate that the present general inventive concept is equally applicable to when the printing operation is requested from a plurality of host devices to a plurality of image forming apparatuses in the network. In other words, the methods illustrated with reference to FIGS. 10 and 12 and the methods illustrated with reference to FIGS. 11 and 12 may be applied at the same time.

Figure 13:
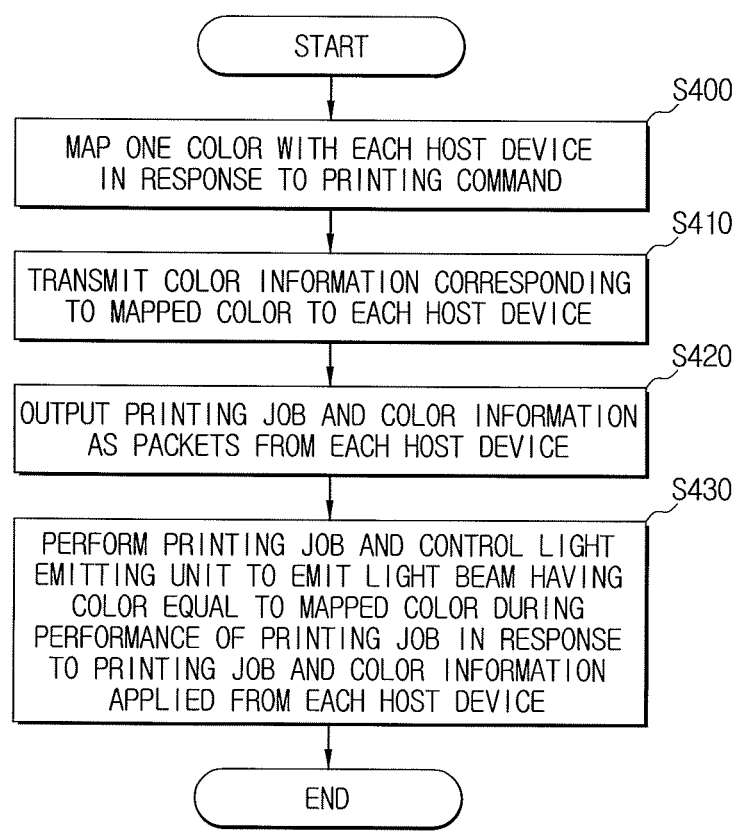
FIG. 13 is a flowchart illustrating a method of driving a printing system according to an embodiment of the present general inventive concept.

FIG. 13 is a flowchart of a method of driving a printing system according to an embodiment of the present general inventive concept. Referring to FIGS. 4 and 13, in operation S400, the host device 200 requesting a printing operation is mapped with one of colors of light beams emitted from the light emitting unit 152 in response to a printing command to perform a printing operation. In operation S410, color information corresponding to the mapped color is transmitted to each host device giving a printing command. In operation S420, the host device 200 requests the printing operation and the color information as packets. In operation S430, the printing operation is performed in response to the requested printing and the color information, and the light emitting unit 152 is controlled to emit a light beam having a color equal to the mapped color during the printing operation.

Operation S400 has been described in detail through operation S100 illustrated in FIGS. 9 through 12, and thus its detailed description will be omitted herein.

In operation S410, the image forming device 100 transmits color information corresponding to the mapped color to the host device 200. Here, if the light emitting unit 152 is driven to distinguish the printing operation as illustrated with reference to FIG. 12, information regarding other host devices requesting printing operation may be transmitted along with color information as packets to display the user display part 310 and the status information display part 330 illustrated in FIG. 6.

In operation S420, the second controller 260 of the host device 200 synthesizes the color information provided from the image forming device 100 and the printing data written in the host device 200 as a packet and outputs the packet.

Here, in operation S410, the printer image may be updated in response to a packet transmitted so that the light emitting unit 152 displayed as an image is displayed with a color on the printer image displayed on the second user interface window illustrated in FIG. 5 or 6. For example, if the printer image is updated using the EWS of the image forming device 100, the packet transmitted in operation S410 includes updated information regarding the printer image through which the printer image is updated. In operation S420, the updated information may be transmitted along with the printing of the data as a packet to the host device 200. If the printer image is updated using the driver of the host device 200, the second controller 260 may update the printer image in response to the color information transmitted from the image forming device 100 in operation S410. Here, the updated information regarding the printer image may not be provided as the packet from the image forming device 100 to the host device 200.

In operation S430, the printing operation that is requested by the image forming device 100 to the host device 200 is performed, and the light emitting unit 152 is controlled to emit a light beam having a color equal to the color mapped with the host device 200 requesting the printing operation in response to the color information transmitted along with the printing of the data as the packet during the printing operation.

In other words, if the light emitting unit 152 emits light beams having different colors to determine the position as illustrated with reference to FIGS. 10 and 11, the user allows a light emitting unit of the image forming device 100-1 requesting the printing operation to emit a light beam having a different color from colors of light beams emitted from light emitting units of the image forming devices 100-2, . . . , and 100-n.

If the light emitting unit 152 emits light beams having different colors to distinguish printing operations as illustrated with reference to FIG. 12, the user allows the light emitting unit 152 to emit a light beam having a different color from colors mapped with the host devices 200-1, 200-3, . . . , and 200-m connected to the network during the printing operation of the host device 200-2 currently requesting the printing operation.

If the light emitting unit 152 is driven to determine the position using the above-described method, the user may identify that a printing operation requested by the user is being performed in an image forming device in which a color expressed by the light emitting unit 152 on the printer image on the second user interface window as illustrated in FIG. 5 is equal to a color of a light beam emitted from the light emitting unit 152 of the image forming device 200 connected to the network.

If the light emitting unit 152 is driven to distinguish the printing operation, a determination may be made as to whether a color expressed on the printer image display part 320 on the second user interface window as illustrated in FIG. 6 is equal to a color expressed on the user display part 310 to determine whether the printing operation requested by the user has been performed. Also, a determination may be made as to whether colors expressed on the printer image part 320, the user display part 310, and the status information display part 330 are equal to one another to determine whether the printing operation requested by the user is being performed or is waiting to be performed.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, according to the present general inventive concept, a light emitting unit can be installed on an outer surface of an image forming device. A printer image can be displayed on a user interface window displayed on a display of a host device. A color of a light beam emitted from the light emitting unit of the image forming device can be equal to a color expressed on the printer image during a printing operation. Thus, a position of one of image forming devices that performs a printing operation requested by a user can be easily determined, wherein the image forming devices are connected to a network.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device connected to a host device through a network to perform a printing operation requested by the host device, comprising:
    a light emitting unit to emit a color light beam; and
    a controller to control the host device to display a color which is mapped from the color light beam emitted from the light emitting unit during the printing operation, wherein the controller identifies colors mapped to other host devices connected to the network and maps a color to the host device which is different than the colors mapped to other host devices connected to the network, and wherein colors of a predetermined color queue are mapped to host devices on the network according to the order in which the respective host devices request printing operations and the order of colors in the predetermined color queue.

2. An image forming device connected to a host device through a network to perform a printing operation requested by the host device, comprising:
  a light emitting unit to emit a color light beam; and
  a controller to control the host device to display a color which is mapped from the color light beam emitted from the light emitting unit during the printing operation,
  wherein colors of a predetermined color queue are mapped to host devices on the network according to the order in which the respective host devices request printing operations and the order of colors in the predetermined color queue.

3. The image forming device of claim 2, wherein the controller transmits to the host device information regarding a host device currently requesting a printing operation, information regarding a color mapped with the host device currently requesting the printing operation according to the color queue, information regarding a host device waiting to request a printing operation, and information regarding a color mapped with the host device waiting to request the printing operation according to the color queue.

4. A host device connected to an image forming device through a network, the host device to request a printing operation to the image forming device, comprising:
  a user interface to display status information of the image forming device and information on colors mapped to other host devices connected to the network; and
  a controller to control the user interface to display a color of a light beam emitted from a light emitting unit of the image forming device during the printing operation,
  wherein the light emitting unit emits a light beam in a plurality of colors as the color light beam,
  wherein the image forming device transmits color information corresponding to a color which is mapped from the color light beam to display the mapped color in the user interface of the host device, receives the printing request and the color information from the host device, and controls the light emitting unit to emit the light beam that has the color that matches the mapped color during the printing operation, and
  wherein colors of a predetermined color queue are mapped to host devices on the network according to the order in which the respective host devices request printing operations and the order of colors in the predetermined color queue.

5. The host device of claim 4, wherein the controller receives color information corresponding to the color of the light beam emitted from the light emitting unit from the image forming device and displays the color on the user interface.

6. The host device of claim 4, wherein the controller receives the color information and image update information from the image forming device to display a color on the user interface.

7. A method of driving an image forming device connected to a host device through a network to perform a printing operation as requested by the host device, comprising:
  mapping the host device that requests the printing operation to a corresponding color;
  transmitting color information corresponding to the mapped color to display the mapped color in a predetermined display area of the host device;
  receiving the printing request and the color information from the host device;
  controlling a light emitting unit to emit a color light beam matching the mapped color of the host device, while executing the printing operation as requested by the host device, wherein the light emitting unit emits a light beam in a plurality of colors as the color light beam, wherein a plurality of colors are mapped to corresponding host devices;
  determining which one of the colors is used on the network;
  designating one of colors not including the color used on the network as a color of the light beam emitted from the light emitting unit;
  mapping the designated color to the host device that requests the printing operation; and
  transmitting color information corresponding to the mapped color to the host device that requests the printing operation,
  wherein colors of a predetermined color queue are mapped to host devices on the network according to the order in which the respective host devices request printing operations and the order of colors in the predetermined color queue.

8. A method of driving an image forming device connected to a host device through a network to perform a printing operation as requested by the host device, comprising:
  mapping the host device that requests the printing operation to a corresponding color;
  transmitting color information corresponding to the mapped color to display the mapped color in a predetermined display area of the host device;
  receiving the printing request and the color information from the host device;
  controlling a light emitting unit to emit a color light beam matching the mapped color of the host device, while executing the printing operation as requested by the host device, wherein the light emitting unit emits a light beam in a plurality of colors as the color light beam, wherein a plurality of colors are mapped to corresponding host devices;
  determining whether a previous printing operation is being performed;
  if it is determined that the previous printing operation is being performed, determining a color mapped to a host device which has requested the previous printing operation and mapping a color of the colors not including the determined color to a host device performing a current printing operation;
  if it is determined that the previous printing operation is not being performed, mapping the host device currently requesting the printing operation according to an order of a predetermined color queue in which the colors are arranged in a predetermined order; and
  transmitting information regarding the mapped colors to the host device,
  wherein colors of the predetermined color queue are mapped to host devices on the network according to the order in which the respective host devices request printing operations and the order of colors in the predetermined color queue.

9. A method of driving a host device connected to an image forming device having a light emitting unit to emit a color light beam through a network to request a printing operation to the image forming device, comprising:
  outputting the requested printing operation;
  receiving color information from the image forming device in response to the requested printing operation; and displaying the color on a user interface that displays status information and driving information of the image forming device and information on colors mapped to other host devices connected to the network, wherein the light emitting unit emits a light beam in a plurality of colors as the color light beam and the image forming device controls the light emitting unit to emit a light beam that has the color corresponding to the color information during the printing operation, wherein colors of a predetermined color queue are mapped to host devices on the network according to the order in which the respective host devices request printing operations and the order of colors in the predetermined color queue.

10. The method of claim 9, wherein the color information and image update information is received from the image forming device to display the color on the user interface.

11. A printing system comprising:

an image forming device to generate one or more signals representing a plurality of colors to correspond to one or more of printing operations and external host devices, including:
   a light emitting unit to emit a light beam in a plurality of colors as a color light beam, and
   a controller to transmit a respective signal to a respective external host device to display a color according to the respective signal in a predetermined display area of the respective external host device, to receive a printing request and color information from the respective external host device, and to control the light emitting unit to emit a light beam that has a color that matches the color information during the printing operation,
   wherein the color corresponding to the respective external host device is selected to be different from colors corresponding to other external host devices connected to the network,
   wherein colors of a predetermined color queue are mapped to external host devices according to the order in which the respective external host devices request printing operations and the order of colors in the predetermined color queue.

12. A printing system comprising:

a host device connected to a network, and to generate one or more signals representing a plurality of colors to correspond to printing operations of other host devices connected to the network and external image forming apparatuses, wherein a respective external image forming apparatus includes:
   a light emitting unit to emit a light beam in a plurality of colors as a color light beam, and
   a controller to transmit color information corresponding to a color which is mapped from the color light beam emitted from the light emitting unit to display the mapped color in a predetermined display area of the host device, to receive a printing request and a respective signal from the host device, and to control the light emitting unit to emit a light beam that has a color that matches the mapped color during the printing operation,
   wherein colors of a predetermined color queue are mapped to host devices on the network according to the order in which the respective host devices request printing operations and the order of colors in the predetermined color queue.

13. A printing system comprising:

an image forming device to generate one or more signals representing one or more of colors to correspond to one or more printing operations according to an order in which the one or more printing operations are received and a color queue; and a host device to generate a signal representing one or more second colors to correspond to one or more image forming devices including the image forming device, wherein the image forming device includes:
   a light emitting unit to emit a light beam in a plurality of colors as a color light beam, and
   a controller to transmit a signal representing a color corresponding to a printing operation of the host device to display the color in a predetermined display area of the host device, to receive a printing request corresponding to the printing operation of the host device and a signal representing a second color corresponding to the image forming device from the host device, and to control the light emitting unit to emit a light beam that has a color that matches the second color during the printing operation,
   wherein colors of a predetermined color queue are mapped to host devices according to the order in which the respective host devices request printing operations and the order of colors in the predetermined color queue.

14. A method of a printing system, the method comprising:

generating one or more signals representing one or more colors to correspond to one or more printing operations and external host devices;

transmitting the one or more signals to a respective external host device to display the corresponding color in a predetermined display area of the respective external host device;

receiving a printing request corresponding to a respective printing operation and color information from the respective external host device; and controlling a light emitting unit to emit a light beam that has a color that matches the received color information during the respective printing operation, wherein the light emitting unit emits a light beam in a plurality of colors as the color light beam, wherein the color corresponding to the respective external host device is selected to be different from colors corresponding to other external host devices connected to the network, wherein colors of a predetermined color queue are mapped to external host devices according to the order in which the respective external host devices request printing operations and the order of colors in the predetermined color queue.

15. A method of printing system including a plurality of host devices and at least one image forming apparatus connected to a network, the method comprising:

generating one or more signals representing one or more colors to correspond to printing operations of the host devices connected to the network and the at least one image forming apparatus;

displaying the one or more colors corresponding to the one or more signals in a predetermined display area of a respective host device;

transmitting a printing request corresponding to a respective printing operation and the one or more signals to the at least one image forming apparatus; and controlling a light emitting unit to emit a light beam that has a color corresponding to the transmitted one or more signals during the respective printing operation, wherein the light emitting unit emits a light beam in a plurality of colors as the color light beam, wherein colors of a predetermined color queue are mapped to host devices according to the order in which the respective host devices request printing operations and the order of colors in the predetermined color queue.

16. A method of a printing system, the method comprising:
using an image forming device to generate one or more signals representing one or more of colors to correspond to one or more printing operations according to an order in which the one or more printing operations are received and a color queue;
using a host device to generate a signal representing one or more second colors to correspond to one or more image forming devices including the image forming device,
transmitting a signal representing a color corresponding to a printing operation of the host device to display the color in a predetermined display area of the host device;
receiving a printing request corresponding to the printing operation of the host device and a signal representing a second color corresponding to the image forming device from the host device; and
controlling the light emitting unit to emit a light beam that has a color that matches the second color during the printing operation, wherein the light emitting unit emits a light beam in a plurality of colors as the color light beam,
wherein colors of a predetermined color queue are mapped to host devices according to the order in which the respective host devices request printing operations and the order of colors in the predetermined color queue.

17. A non-transitory computer readable recording medium containing computer readable codes as a program to perform a method, the method comprising:
using an image forming device to generate one or more signals representing a plurality of colors to corresponding to one or more of printing operations and other host devices;
transmitting the one or more signals to a respective external host device to display the corresponding color in a predetermined display area of the respective external host device;
receiving a printing request corresponding to a respective printing operation and color information from the respective external host device; and
controlling a light emitting unit to emit a light beam that has a color that matches the received color information during the respective printing operation, wherein the light emitting unit emits a light beam in a plurality of colors as the color light beam,
wherein the color corresponding to the respective external host device is selected to be different from colors corresponding to other external host devices connected to the network,
wherein colors of a predetermined color queue are mapped to external host devices according to the order in which the respective external host devices request printing operations and the order of colors in the predetermined color queue.

18. A non-transitory computer readable recording medium containing computer readable codes as a program to perform a method, the method comprising:
using a host device connected to a network to generate one or more signals representing a plurality of colors to correspond to printing operations of other host devices connected to the network and external image forming apparatuses;
displaying the one or more colors corresponding to the one or more signals in a predetermined display area of a host device;
transmitting a printing request corresponding to a respective printing operation and the one or more signals to a respective external image forming apparatus; and
controlling a light emitting unit to emit a light beam that has a color corresponding to the transmitted one or more signals during the respective printing operation, wherein the light emitting unit emits a light beam in a plurality of colors as the color light beam,
wherein colors of a predetermined color queue are mapped to host devices on the network according to the order in which the respective host devices request printing operations and the order of colors in the predetermined color queue.

19. A printing system comprising:
a device to select one or more colors to be assigned to one or more of an image forming device, a host device, and a printing device connected to a network;
a light emitting unit to emit a light beam in a plurality of colors as a color light beam,
a controller to transmit color information corresponding to a color which is mapped from the color light beam to display the mapped color in a predetermined display area of the host device, to receive a printing request and the color information from the host device, and to control the light emitting unit to emit a light beam that has a color that matches the mapped color during the printing operation,
wherein a color assigned to the host device is selected to be different from colors assigned to other host devices connected to the network, and
wherein colors of a predetermined color queue are mapped to host devices on the network according to the order in which the respective host devices request printing operations and the order of colors in the predetermined color queue.

20. A method of driving an image forming device connected to a plurality of host devices through a network to perform a printing operation as requested by a respective host device and having a light emitting unit to emit a color light beam, the method comprising:
determining whether a previous printing operation is being performed;
if it is determined that the previous printing operation is being performed, determining a color mapped to a host device which has requested the previous printing operation and mapping a color of the colors not including the determined color to a host device currently requesting the printing operation;
if it is determined that the previous printing operation is not being performed, mapping a color to the host device currently requesting the printing operation according to an order of a color queue in which the colors are arranged in a predetermined order; and
transmitting information regarding the mapped colors to the host device to display the mapped color in a predetermined display area of the host device;
receiving the printing request and color information from the host device; and
controlling the light emitting unit to emit a light beam matching the mapped color of the host device, while executing the printing operation as requested by the host device, wherein the light emitting unit emits a light beam in a plurality of colors as the color light beam, wherein colors of a predetermined color queue are mapped to host devices on the network according to the order in which the respective host devices request printing operations and the order of colors in the predetermined color queue.

* * * * *